US012455754B2

(12) United States Patent
Ramanathan et al.

(10) Patent No.: US 12,455,754 B2
(45) Date of Patent: Oct. 28, 2025

(54) DATA PLANE ISOLATION FOR VIRTUAL MACHINE (VM) MOBILITY OPERATIONS

(71) Applicant: VMware LLC, Palo Alto, CA (US)

(72) Inventors: Arunachalam Ramanathan, Union City, CA (US); Siddharth Sudir Ekbote, San Jose, CA (US); Nathan Lyle Prziborowski, Eugene, OR (US); Derek William Beard, Austin, TX (US); Yanlei Zhao, Saratoga, CA (US); Pavan Narasimhaprasad, Cedar Park, TX (US)

(73) Assignee: VMware LLC, Palo Alto, CA (US)

( * ) Notice: Subject to any disclaimer, the term of this patent is extended or adjusted under 35 U.S.C. 154(b) by 796 days.

(21) Appl. No.: 17/578,302

(22) Filed: Jan. 18, 2022

(65) Prior Publication Data

US 2023/0259381 A1   Aug. 17, 2023

(51) Int. Cl.
*G06F 9/44* (2018.01)
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC .................................................. G06F 9/45558
USPC .............................................................. 718/1
See application file for complete search history.

(56) References Cited

U.S. PATENT DOCUMENTS

| 2009/0150529 | A1* | 6/2009 | Tripathi | .................. | G06F 9/455 |
| | | | | | 709/222 |
| 2023/0041806 | A1* | 2/2023 | Singh | .................. | H04L 63/0428 |

* cited by examiner

*Primary Examiner* — Timothy A Mudrick
(74) *Attorney, Agent, or Firm* — Quarles & Brady LLP

(57) ABSTRACT

Techniques for implementing data plane isolation for VM mobility operations are provided. In one set of embodiments, these techniques include creating a virtual network path between a source host system and a destination host system participating in a VM mobility operation, which allows the host systems to exchange data for carrying out the operation without exposing their physical IP addresses to each other and without requiring the use of intermediate proxies. In certain embodiments, the virtual network path can be dynamically established upon initiation of the VM mobility operation and dynamically rolled back upon operation completion, thereby reducing the overhead of virtual path management.

21 Claims, 4 Drawing Sheets

DATA PLANE ISOLATION FOR VIRTUAL MACHINE (VM) MOBILITY OPERATIONS

BACKGROUND

Unless otherwise indicated, the subject matter described in this section is not prior art to the claims of the present application and is not admitted as being prior art by inclusion in this section.

Virtual machine (VM) mobility is a virtualization feature that allows a VM to be moved from one physical host system to another. Among other things, this facilitates proactive host maintenance, the load balancing of compute workloads across host systems, and VM high availability/fault tolerance. There are generally two types of VM mobility operations: live (or hot) migration, which involves moving a VM while it is running, and cold migration, which involves moving a VM while it is powered-off.

In existing virtual infrastructure (VI) platforms, a direct network route is typically required between the source and destination host systems participating in a VM mobility operation. In other words, the source host system must have knowledge of and be able to transmit network packets to the Internet Protocol (IP) address of the destination host system, and conversely the destination host system must have knowledge of and be able to transmit network packets to the IP address of the source host system. This requirement is problematic if the source and destination host systems reside in sites that correspond to different VI management domains (e.g., data centers managed by different VI management servers) because the host systems may not have visibility of each other's IP addresses in this scenario.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for implementing data plane isolation for VM mobility operations. Stated another way, these techniques enable a VM to be moved from a source host system to a destination host system while keeping the host systems' actual (i.e., physical) IP addresses private from each other.

Generally speaking, this is achieved via the creation of a virtual network path between the source and destination host systems, which allows the host systems to exchange data for carrying out the VM mobility operation without exposing their physical IP addresses to each other and without requiring the use of intermediate proxies. In certain embodiments, the virtual network path can be dynamically established upon initiation of the VM mobility operation and dynamically rolled back upon operation completion, thereby reducing the overhead of virtual path management. The foregoing and other aspects are described in further detail below.

2. Example Environment and High-Level Workflow

Figure 1:
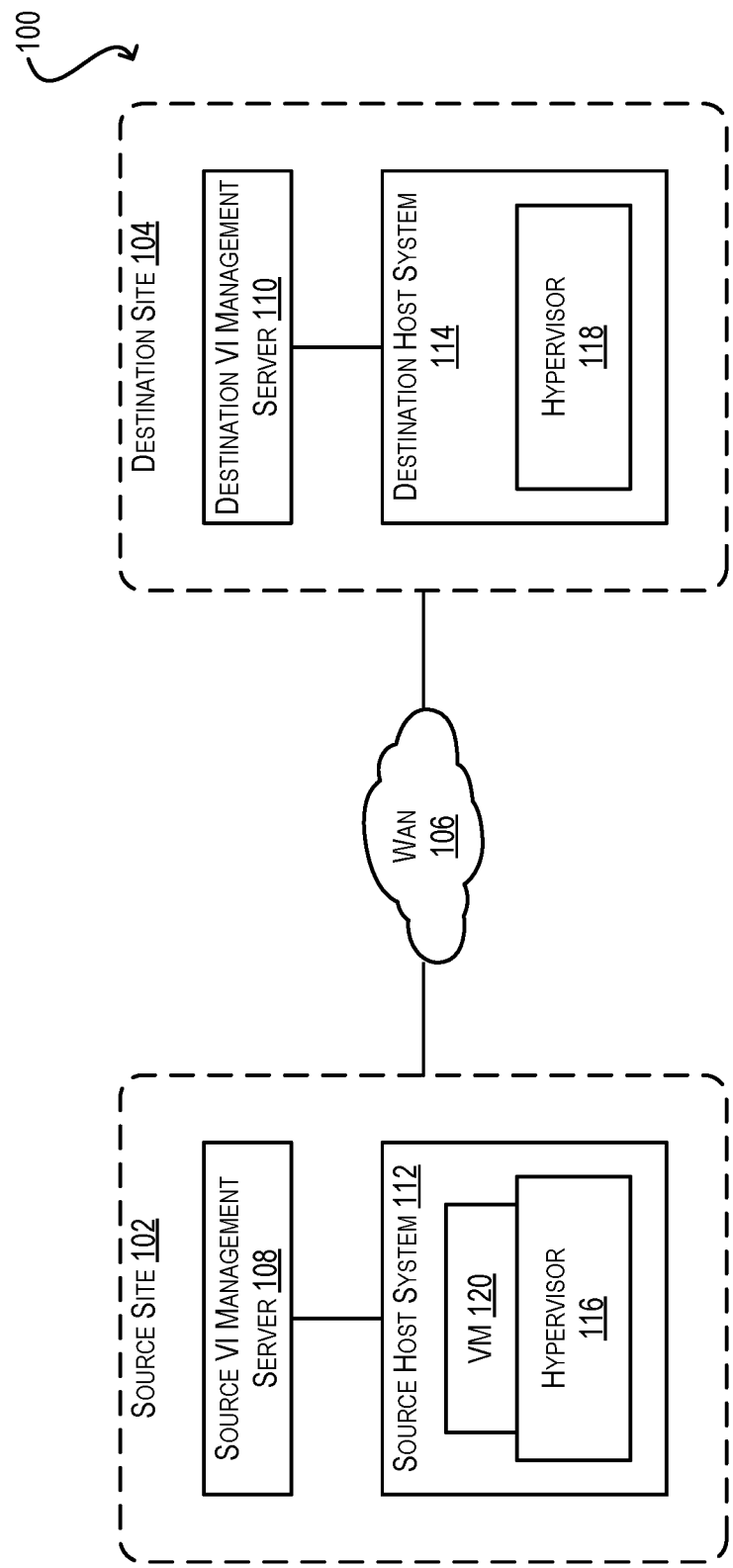
FIG. 1 depicts an example environment.

FIG. 1 depicts an example environment 100 in which embodiments of the present disclosure may be implemented. As shown, environment 100 includes a first (source) site 102 and a second (destination) site 104 that are communicatively coupled via wide area network (WAN) 106. Sites 102 and 104 are computing sites (e.g., data centers) that run virtualized computing workloads of a common entity but are managed by different VI management servers (i.e., source VI management server 108 and destination VI management server 110). For example, site 102 may be an on-premises data center of an enterprise that is managed by a local VI management server and site 104 may be a private or public cloud data center of that enterprise that is managed by a separate, cloud-based VI management server. Accordingly, in this example sites 102 and 104 are part of two different VI management domains corresponding to servers 108 and 110 respectively.

Each site 102/104 includes at least one host system 112/114 (i.e., source host system 112 and destination host system 114) comprising a hypervisor 116/118 that provides an execution environment for running one or more VMs. Hypervisors 116 and 118 may be a bare-metal hypervisor, a hosted hypervisor, or any other type of hypervisor known in the art. In addition, source host system 112 includes a VM 120 running on top of hypervisor 116. For the purposes of this disclosure, it is assumed that at some point a VM mobility operation will be initiated for moving VM 120 from source host system 112 of source site 102 to destination host system 114 of destination site 104 for one or more reasons (e.g., load balancing, planned maintenance at source host system 112/source site 102, etc.). This VM mobility operation may be a live (i.e., hot) migration or a cold migration.

As noted in the Background section, one issue with moving a VM across sites that are part of different VI management domains as contemplated in FIG. 1 is that the source and destination host systems may not have visibility of their respective IP addresses, but this IP visibility is needed in order to execute the VM mobility operation. For example, due to security concerns and/or compliance requirements, the operators of sites 102 and 104 may restrict the sharing of physical IP addresses within each site to external networks/entities. This means that source host system 112 and destination host system 114 cannot establish an end-to-end network path and thus cannot migrate VM 120.

A solution for this issue is to implement proxy host systems at the source and destination sites and execute a two-phase migration of VM 120 that involves a first local migration from source host system 112 to the source-side proxy at source site 102 and a second local migration from the destination-side proxy to destination host system 114 at destination site 104. These two local migrations are stitched together via communication between the two proxies over WAN 106. However, this approach suffers from its own set of problems, such as relatively poor performance (due to the need to execute two separate migration procedures) and management overhead for maintaining the specialized hypervisors running in each proxy.

Figure 2:
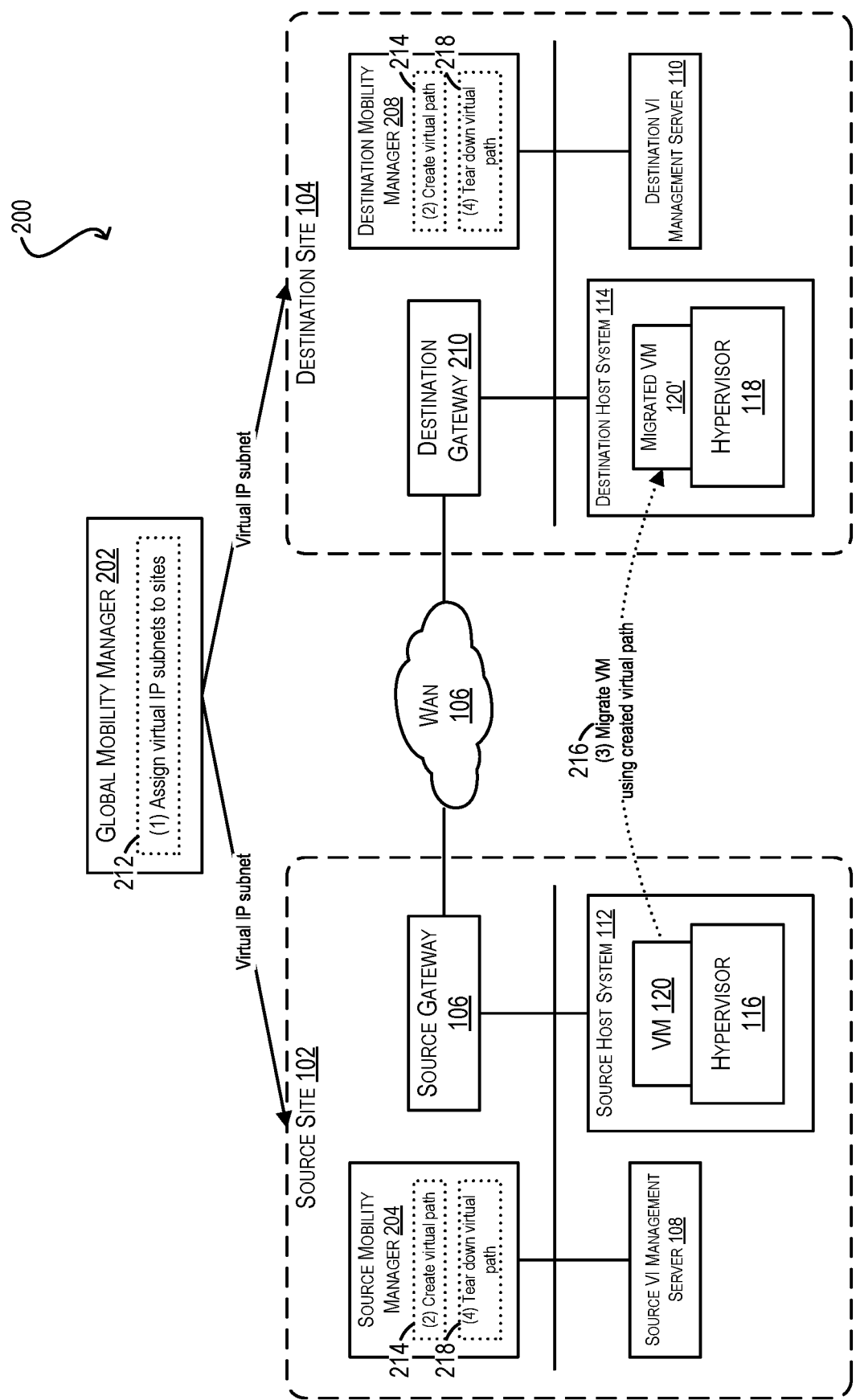
FIG. 2 depicts an enhanced version of the environment of FIG. 1 and a VM migration workflow executed within the environment according to certain embodiments.

To address the foregoing, FIG. 2 depicts an enhanced version of environment 100 of FIG. 1 (i.e., environment 200) that includes the following new components: a global mobility manager 202 coupled with sites 102 and 104, a source mobility manager 204 and source gateway 206 at source site 102, and a destination mobility manager 208 and destination gateway 210 at destination site 104. Mobility managers 202, 204, and 208 are software components that can run on any physical or virtual machine. Gateways 206 and 210 are physical or virtual network devices that serve as Layer 3 (L3) virtual private network (VPN) endpoints within sites 102 and 104 respectively and as L3 routers for enabling direct network connections between the sites over WAN 106.

In addition, FIG. 2 depicts a novel high-level workflow comprising steps (1) through (4) (reference numerals 212-218) that is enabled by components 202-210 for migrating VM 120 from source host system 112 to destination host system 114 while maintaining data plane isolation across sites 102 and 104. Starting with step (1), global mobility manager 202 can assign a virtual IP subnet to each site 102/104. This may occur, for example, at the time these sites are initially provisioned within environment 200. In various embodiments, global mobility manager 202 can carve out the virtual IP subnet for each site from a virtual IP super-net, which may be some IP address space that is preconfigured on manager 202 (e.g., 100.64.0.0/10) or defined by the environment administrator.

Then, at the time a mobility operation is initiated for moving VM 120 from source host system 112 to destination host system 114, source and destination mobility managers 204 and 208 can dynamically create a virtual network path between the host systems based on the virtual IP subnets assigned by global mobility manager 202 (step (2)). As detailed in section (3) below, this can involve allocating virtual IP addresses to host systems 112 and 114 from the virtual IP subnets and configuring these systems, as well as source and destination gateways 206 and 210, in a manner that ensures all migration traffic will be correctly routed over WAN 106 between the virtual IP addresses (and thus, between the source and destination host systems).

Once the virtual network path has been created, source and destination host systems 112 and 114 can proceed with executing the migration of VM 120 via the created path (step (3)), resulting in migrated VM 120' at destination host system 114. Significantly, because source host system 112 only knows the virtual IP address (and not the physical IP address) of destination host system 114 and vice versa, the migration can be achieved without revealing the host systems' physical IP addresses to each other.

Finally, upon migration completion, source and destination mobility managers 204 and 208 can tear down the virtual network path (step (4)) and the workflow can end.

With the solution shown in FIG. 2, a number of advantages are realized. First, because source host system 112 and destination host system 114 can directly communicate with each other via the virtual network path created at step (2), they can carry out the migration of VM 120 while maintaining data plane isolation (such that the physical IP address of system 112 is not exposed to destination site 104 and the physical IP address of system 114 is not exposed to source site 102) and without requiring the use of intermediate proxy host systems. Accordingly, this solution makes VM mobility operations across different VI management domains possible while avoiding the performance and maintenance drawbacks of the proxy approach.

Second, because virtual network path creation is fully managed and automated by mobility managers 202, 204, and 208, there are no changes needed on host systems 112 and 114 with respect to migration execution and there is no need for manual management of a parallel virtual IP address space.

Third, by tearing down the virtual network path at the conclusion of the migration, source and destination mobility managers 204 and 208 can minimize the amount of overhead needed to keep track of assigned virtual IP addresses. For example, these managers can maintain a relatively small virtual IP address space (regardless of the total number of physical host systems at sites 102 and 104) by recycling the virtual IP addresses in this space as VM mobility operations are initiated and completed.

It should be appreciated at FIGS. 1 and 2 are illustrative and not intended to limit embodiments of the present disclosure. For instance, although global mobility manager 202 and site-specific mobility managers 204 and 208 are shown as distinct entities, in certain embodiments the functions performed by global manager 202 may be incorporated into site-specific managers 204 and 208 or vice versa. As one example, in a particular embodiment global mobility manager 202 may participate in the creation of the virtual network path at step (2), such as by directly allocating virtual IP addresses to source and destination host systems 112 and 114.

Further, while FIGS. 1 and 2 contemplate a scenario in which source host system 112 and destination host system 114 are part of different sites which in turn are part of separate VI management domains (i.e., managed by different VI management servers), in alternative embodiments this specific arrangement is not required. For example, in one set of embodiments, source site 102 and destination site 104 may be part of the same VI management domain and thus managed by a single VI management server. In another set of embodiments, source host system 112 and destination host system 114 may reside within a single site that is split into different VI management domains. In these embodiments, the virtual network path created between the source and destination host systems can be used to support data plane isolation in the scenario where, for example, the two host systems belong to different subnets within the single site.

Further, although the workflow of FIG. 2 assumes that data plane isolation is desired for both source site 102 and destination site 104, in some cases this isolation may only be needed for a single site. For these scenarios, the virtual network path created at step (2) can be adapted to hide the physical IP address of the host system at that single site.

Yet further, the techniques of the present disclosure do not require dynamic creation of the virtual network path and/or teardown of the path upon migration completion; instead, in alternative embodiments the virtual network path can be created in a static manner (e.g., at some time prior to the migration of VM 120) and can be kept in place once the VM has been migrated. This approach may be preferable for relatively small deployments with a limited number of host systems at each site.

3. Virtual Network Path Creation and Migration Process

Figure 3:
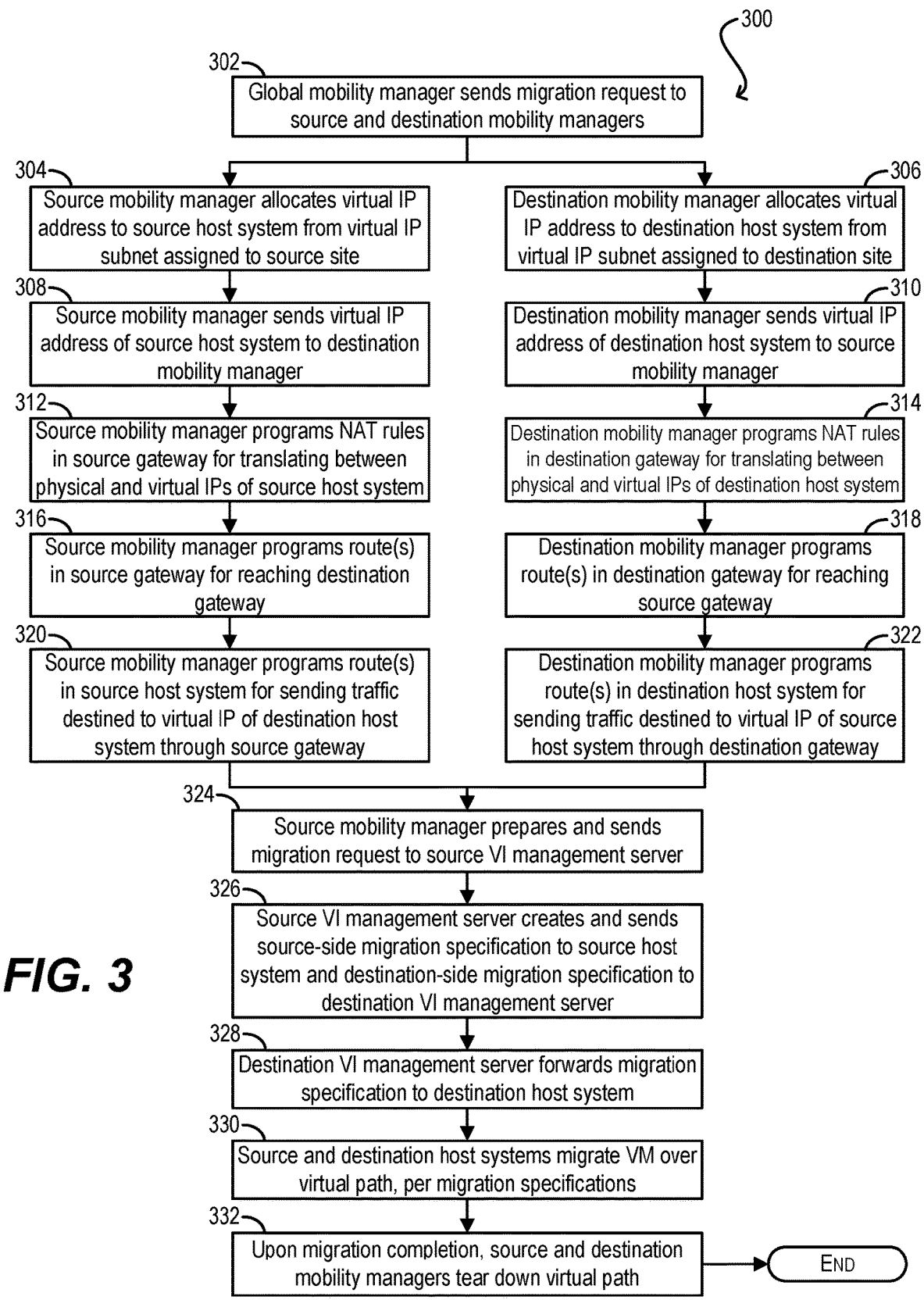
FIG. 3 depicts a more detailed version of the workflow of FIG. 2 according to certain embodiments.

FIG. 3 depicts a flowchart 300 that provides additional details regarding the implementation of steps (2)-(4) of FIG. 2 (i.e., virtual network path creation and the migration of VM 120) according to certain embodiments. Flowchart 300 assumes that global mobility manager has assigned virtual IP subnets to source site 102 and destination site 104 per step (1) of FIG. 2.

Starting with block 302 of flowchart 300, global mobility manager 202 can send a migration request to source and destination mobility managers 204 and 208 that identifies the VM to be moved (i.e., VM 120) and the source and destination host systems participating in the mobility operation (i.e., host systems 112 and 114).

In response, source and destination mobility managers 204 and 208 can concurrently carry out a series of actions for creating a virtual network path between source host system 112 and destination host system 114 (blocks 304-322). For instance, at blocks 304 and 306, source/destination mobility manager 204/208 can allocate a virtual IP address to source/destination host system 112/114 from the virtual IP subnet assigned to its respective site. The following table lists an example set of physical IP addresses for source and destination host systems 112 and 114 and virtual IP addresses allocated to these systems per blocks 304 and 306:

TABLE 1

|  | Physical IP Address | Virtual IP Address |
| --- | --- | --- |
| Source Host System | 192.168.1.10 | 100.64.1.11 |
| Destination Host System | 192.168.1.20 | 100.64.2.21 |

At blocks 308 and 310, source and destination mobility managers 204 and 208 can exchange the virtual IP addresses they have allocated at blocks 304 and 306. In other words, source mobility manager 204 can obtain the virtual IP address allocated to destination host system 114 from destination mobility manager 208 and destination mobility manager 208 can obtain the virtual IP address allocated to source host system 112 from source mobility manager 204.

At blocks 312 and 314, source/destination mobility manager 204/208 can program network address translation (NAT) rules into its respective source/destination gateway 206/210 for performing network address translation between the physical and virtual IP addresses of source/destination host system 112/114. For example, source mobility manager 204 can program NAT rules into source gateway 206 for translating the physical IP address of source host system 112 to its allocated virtual IP address on outgoing network packets (i.e., packets going out to WAN 106) and translating the virtual IP address of source host system 112 to its physical IP address on incoming network packets (i.e., packets received from WAN 106). Similarly, destination mobility manager 208 can program NAT rules into destination gateway 210 for translating the physical IP address of destination host system 114 to its allocated virtual IP address on outgoing network packets and translating the virtual IP address of destination host system 114 to its physical IP address on incoming network packets.

Source/destination mobility manager 204/208 can further program routes into source/destination gateway 206/210's L3 VPN that enable the gateways to directly reach each other over WAN 106 (blocks 316 and 318) and can program routes into source/destination host system 112/114's routing table that sends all traffic destined for the virtual IP address of the other host system through source/destination gateway 206/210 (blocks 320 and 322). This latter step ensures that all network traffic pertaining to the migration of VM 120 passes through source and destination gateways 206 and 210 for network address translation.

At the conclusion of blocks 320 and 322, the virtual network path between source and destination host systems 112 and 114 will be established. At this point, source mobility manager 204 can prepare and send a migration request to source VI management server 108 that includes the virtual and physical IP addresses of source host system 112 and the virtual IP address of destination host system 114 (block 324).

In response, source VI management server 108 can create a source-side migration specification that identifies VM 120 as the VM to be migrated, the physical IP address of source host system 112 as the source for the migration, and the virtual IP address of destination host system 114 as the destination for the migration and can send this specification to hypervisor 116 of source host system 112 (block 326). Source VI management server 108 can also create a destination-side migration specification that identifies VM 120 as the VM to be migrated, the virtual IP address of source host system 112 as the source for the migration, and the virtual IP address of destination host system 114 as the destination for the migration and can send this specification to destination VI management server 110 (block 326). In response, destination VI management server 110 can receive the destination-side migration specification, resolve destination host system 114's physical IP address from the virtual IP address included in the received specification, and forward the specification to destination host system 114 (block 328).

Once the hypervisors of source and destination host systems 112 and 114 have received their respective migration specifications, they can carry out the migration of VM 120, with source host system 112 using the virtual (rather than physical) IP address of destination host system 114 as the migration destination and destination host system 114 using the virtual (rather than physical) IP address of source host system 112 as the migration source, per the specifications (block 330). With respect to the forward packet flow of this migration process (i.e., network packets sent by source host system 112 to destination host system 114), the packets will first be transmitted to source gateway 206 per the L3 VPN configuration performed by the source mobility manager 204 at block 316. Source gateway 206 will perform NAT on these packets to translate the physical IP address of source host system 112 (found in the source IP field of the packets) to its virtual IP address before sending the packets out on WAN 106. Then, upon being received at destination site 104, destination gateway 210 will perform NAT on the packets to translate the virtual IP address of destination host system 114 (found in the destination IP field of the packets) to its physical IP address, before forwarding the packets to system 114.

Similarly, with respect to the reverse packet flow of the migration process (i.e., network packets sent by destination host system 114 to source host system 112), the packets will first be transmitted to destination gateway 210 per the L3 VPN configuration performed by the destination mobility manager 208 at block 318. Destination gateway 210 will perform NAT on these packets to translate the physical IP address of destination host system 114 (found in the source IP field of the packets) to its virtual IP address before sending the packets out on WAN 106. Then, upon being received at source site 102, source gateway 206 will perform NAT on the packets to translate the virtual IP address of source host system 112 (found in the destination IP field of the packets) to its physical IP address, before forwarding the packets to system 112.

Figure 4:
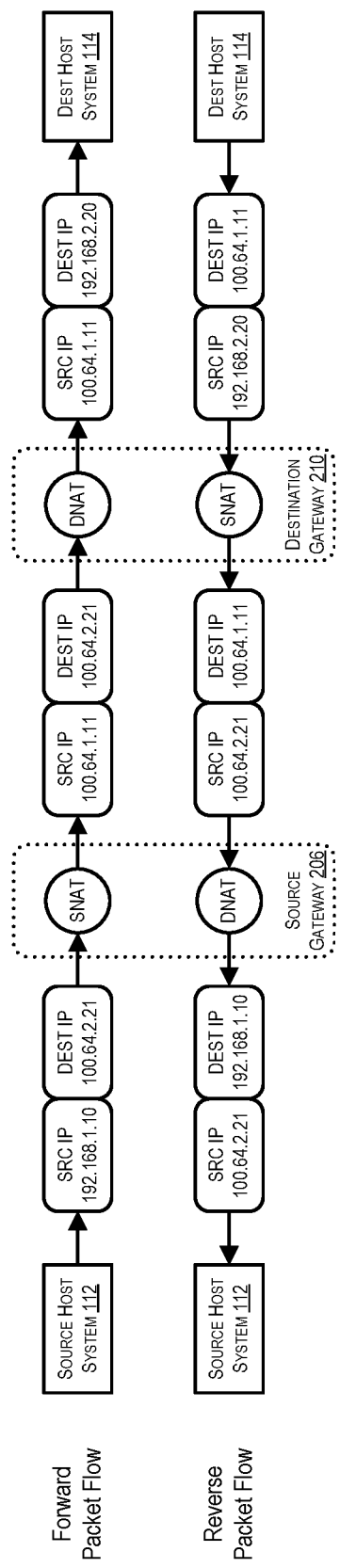
FIG. 4 depicts example forward and reverse packet flows according to certain embodiments.

Examples of these forward and reverse packet flows in the scenario where source and destination host systems 112 and 114 have the physical and virtual IP addresses shown in Table 1 above, along with the network address translations that occur at the source and destination gateways, are depicted in FIG. 4.

Finally, once the migration of VM 120 is done, source and destination mobility managers 204 and 208 can tear down the virtual network path created via blocks 304-322 (block 332). This teardown process can include removing the NAT rules and routes in the L3 VPN of source and destination gateways 206 and 210, removing the routes added to the routing tables of source and destination host systems 112 and 114, and relinquishing the virtual IP addresses allocated to systems 112 and 114. Flowchart 300 can subsequently end.

It should be appreciated that flowchart 300 is illustrative and various modifications are possible. For example, in scenarios where source site 102 and destination site 104 are part of different cloud environments, it may not be possible to address destination host system 114 via its virtual (i.e., WAN) IP address within source site 102 or address source host system 112 via its virtual (i.e., WAN) IP address within destination site 102. In these scenarios, each host system may be allocated a separate, local IP alias address mapped to its virtual IP address and source and destination gateways 206 and 210 may perform double NAT on the migration network traffic passed between the sites in order to translate this local alias address into the corresponding virtual IP address.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O.

Further, certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present disclosure. In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
receiving, by a first computer system and a second computer system, a request to migrate a virtual machine (VM) from a source host system to a destination host system, the request being sent by global mobility manager, the global mobility manager being configured to allocate virtual addresses and routes in a networking routing table;
creating, by the first and second computer systems, a virtual network path between the source and destination host systems, the virtual network path enabling the source and destination host systems to migrate the VM without exposing a physical Internet Protocol (IP) address of the source host system to the destination host system or a physical IP address of the destination host system to the source host system; and
once the VM has been migrated, tearing down, by the first and second computer systems, the virtual network path;
wherein the first computer system and the second computer system reside in different virtual infrastructure management domains and are connected via a wide area network.

2. The method of claim 1 wherein the first computer system and first host system reside at a first site, wherein the second computer system and the second host system reside at a second site, and wherein the first and second sites are part of different virtual infrastructure (VI) management domains.

3. The method of claim 1 wherein creating the virtual network path comprises:
allocating, by the first computer system, a virtual IP address to the source host system from a first virtual IP subnet assigned to the first site;
allocating, by the second computer system, a virtual IP address to the destination host system from a second virtual IP subnet assigned to the second site;
sending, by the first computer system, the virtual IP address allocated to the source host system to the second computer system; and
sending, by the second computer system, the virtual IP address allocated to the destination host system to the first computer system.

4. The method of claim 3 wherein the first and second virtual IP subnets are assigned by a third computer system configured to ensure that the virtual network path can be created without conflicts in the virtual IP addresses allocated to the source and destination host systems.

5. The method of claim 3 wherein creating the virtual network path further comprises:
programming, by the first computer system, one or more network address translation (NAT) rules in a first gateway at the first site for translating between the virtual IP address allocated to the source host system and a physical IP address of the source host system; and programming, by the second computer system, one or more NAT rules in a second gateway at the second site for translating between the virtual IP address allocated to the destination host system and a physical IP address of the destination host system.

6. The method of claim 4 wherein creating the virtual network path further comprises:
programming, by the first computer system, one or more routes in a network routing table of the source host system for forwarding all network traffic destined for the virtual IP address allocated to the destination host system to the first gateway; and
programming, by the second computer system, one or more routes in a network routing table of the destination host system for forwarding all network traffic destined for the virtual IP address allocated to the source host system to the second gateway.

7. The method of claim 4 wherein, upon creation of the virtual network path, a first VI management server at the first site sends a first migration specification to the source host system that specifies the VM and the virtual IP address allocated to the destination host system and sends a second migration specification to a second VI management server at the second site that specifies the VM and the virtual IP address allocated to the source host system, and wherein the second VI management server sends the second migration specification to the destination host system.

8. A non-transitory computer readable storage medium having stored thereon program code executable by a first computer system and a second computer system, the program code embodying a method comprising:
receiving a request to migrate a virtual machine (VM) from a source host system to a destination host system, the request being sent by global mobility manager, the global mobility manager being configured to allocate virtual addresses and routes in a networking routing table;
creating a virtual network path between the source and destination host systems, the virtual network path enabling the source and destination host systems to migrate the VM without exposing a physical Internet Protocol (IP) address of the source host system to the destination host system or a physical IP address of the destination host system to the source host system; and
once the VM has been migrated, tearing down the virtual network path;
wherein the first computer system and the second computer system reside in different virtual infrastructure management domains and are connected via a wide area network.

9. The non-transitory computer readable storage medium of claim 8 wherein the first computer system and first host system reside at a first site, wherein the second computer system and the second host system reside at a second site, and wherein the first and second sites are part of different virtual infrastructure (VI) management domains.

10. The non-transitory computer readable storage medium of claim 8 wherein creating the virtual network path comprises:
allocating, by the first computer system, a virtual IP address to the source host system from a first virtual IP subnet assigned to the first site;
allocating, by the second computer system, a virtual IP address to the destination host system from a second virtual IP subnet assigned to the second site;

sending, by the first computer system, the virtual IP address allocated to the source host system to the second computer system, and sending, by the second computer system, the virtual IP address allocated to the destination host system to the first computer system.

11. The non-transitory computer readable storage medium of claim 10 wherein the first and second virtual IP subnets are assigned by a third computer system configured to ensure that the virtual network path can be created without conflicts in the virtual IP addresses allocated to the source and destination host systems.

12. The non-transitory computer readable storage medium of claim 10 wherein creating the virtual network path further comprises:

programming, by the first computer system, one or more network address translation (NAT) rules in a first gateway at the first site for translating between the virtual IP address allocated to the source host system and a physical IP address of the source host system; and programming, by the second computer system, one or more NAT rules in a second gateway at the second site for translating between the virtual IP address allocated to the destination host system and a physical IP address of the destination host system.

13. The non-transitory computer readable storage medium of claim 10 wherein creating the virtual network path further comprises:

programming, by the first computer system, one or more routes in a network routing table of the source host system for forwarding all network traffic destined for the virtual IP address allocated to the destination host system to the first gateway; and programming, by the second computer system, one or more routes in a network routing table of the destination host system for forwarding all network traffic destined for the virtual IP address allocated to the source host system to the second gateway.

14. The non-transitory computer readable storage medium of claim 11 wherein, upon creation of the virtual network path, a first VI management server at the first site sends a first migration specification to the source host system that specifies the VM and the virtual IP address allocated to the destination host system and sends a second migration specification to a second VI management server at the second site that specifies the VM and the virtual IP address allocated to the source host system, and wherein the second VI management server sends the second migration specification to the destination host system.

15. A first computer system comprising:
a processor; and
a non-transitory computer readable medium having stored thereon program code that causes the processor to, in conjunction with a second computer system:
receive a request to migrate a virtual machine (VM) from a source host system to a destination host system, the request being sent by global mobility manager, the global mobility manager being configured to allocate virtual addresses and routes in a networking routing table;
create a virtual network path between the source and destination host systems, the virtual network path enabling the source and destination host systems to migrate the VM without exposing a physical Internet Protocol (IP) address of the source host system to the destination host system or a physical IP address of the destination host system to the source host system; and
once the VM has been migrated, tear down the virtual network path
wherein the first computer system and the second computer system reside in different virtual infrastructure management domains and are connected via a wide area network.

16. The first computer system of claim 15 wherein the first computer system and first host system reside at a first site, wherein the second computer system and the second host system reside at a second site, and wherein the first and second sites are part of different virtual infrastructure (VI) management domains.

17. The first computer system of claim 15 wherein as part of creating the virtual network path, the first computer system allocates a virtual IP address to the source host system from a first virtual IP subnet assigned to the first site, the second computer system allocates a virtual IP address to the destination host system from a second virtual IP subnet assigned to the second site, the first computer system sends the virtual IP address allocated to the source host system to the second computer system, and 7 the second computer system sends the virtual IP address allocated to the destination host system to the first computer system.

18. The first computer system of claim 17 wherein the first and second virtual IP subnets are assigned by a third computer system configured to ensure that the virtual network path can be created without conflicts in the virtual IP addresses allocated to the source and destination host systems.

19. The first computer system of claim 17 wherein as part of creating the virtual network path, the first computer system further programs one or more network address translation (NAT) rules in a first gateway at the first site for translating between the virtual IP address allocated to the source host system and a physical IP address of the source host system, and the second computer system further programs one or more NAT rules in a second gateway at the second site for translating between the virtual IP address allocated to the destination host system and a physical IP address of the destination host system.

20. The first computer system of claim 17 wherein as part of creating the virtual network path, the first computer system further programs one or more routes in a network routing table of the source host system for forwarding all network traffic destined for the virtual IP address allocated to the destination host system to the first gateway, and the second computer system further programs one or more routes in a network routing table of the destination host system for forwarding all network traffic destined for the virtual IP address allocated to the source host system to the second gateway.

21. The first computer system of claim 18 wherein, upon creation of the virtual network path, a first VI management server at the first site sends a first migration specification to the source host system that specifies the VM and the virtual IP address allocated to the destination host system and sends a second migration specification to a second VI management server at the second site that specifies the VM and the virtual IP address allocated to the source host system, and wherein the second VI management server sends the second migration specification to the destination host system.

* * * * *